US012717532B2

(12) United States Patent
Furumi

(10) Patent No.: US 12,717,532 B2
(45) Date of Patent: Aug. 25, 2026

(54) DISPLAY METHOD, DISPLAY DEVICE, AND NON-TRANSITORY COMPUTER-READABLE STORAGE MEDIUM STORING INFORMATION PROCESSING PROGRAM

(71) Applicant: SEIKO EPSON CORPORATION, Tokyo (JP)

(72) Inventor: Yoshiyuki Furumi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 19/083,576

(22) Filed: Mar. 19, 2025

(65) Prior Publication Data

US 2025/0306833 A1 Oct. 2, 2025

(30) Foreign Application Priority Data

Mar. 26, 2024 (JP) ................................ 2024-048998

(51) Int. Cl.
*G06F 3/14* (2006.01)

(52) U.S. Cl.
CPC ..................................... *G06F 3/14* (2013.01)

(58) Field of Classification Search
CPC .. G06F 3/14; G09G 5/006; G09G 2320/0606; G09G 2330/021; G09G 2354/00; H04N 21/485; H04N 9/3141; H04N 21/4122; H04N 21/43635
See application file for complete search history.

(56) References Cited

U.S. PATENT DOCUMENTS

| | | | | |
|---|---|---|---|---|
| 12,165,564 | B2 * | 12/2024 | Cheng | H04N 7/10 |
| 2012/0169608 | A1 | 7/2012 | Forutanpour et al. | |
| 2013/0326092 | A1 * | 12/2013 | Kang | G06F 13/102 719/321 |
| 2019/0129495 | A1 * | 5/2019 | Guynes | G06F 3/0482 |
| 2021/0279701 | A1 * | 9/2021 | Takamoto | G07G 1/0009 |

FOREIGN PATENT DOCUMENTS

| | | |
|---|---|---|
| JP | 2016-161916 A | 9/2016 |

* cited by examiner

*Primary Examiner* — Amit Chatly
(74) *Attorney, Agent, or Firm* — Dority & Manning, P.A.

(57) ABSTRACT

According to an aspect of the present disclosure, there is provided a display method in a display device, including displaying an explanation screen including explanation of a first mode for starting the display device in response to a first trigger and explanation of a second mode for starting the display device in response to a second trigger different from the first trigger and displaying a setting screen for receiving setting of one of the first mode and the second mode after displaying the explanation screen. The explanation screen includes at least one of explanation concerning power consumption of the display device in the first mode and explanation concerning power consumption of the display device in the second mode.

8 Claims, 9 Drawing Sheets

SET START METHOD FOR AUTO POWER-ON.

[COUPLING DETECTION]: WHEN CABLE IS COUPLED TO HDMI1 TERMINAL, POWER IS AUTOMATICALLY TURNED ON.

[SIGNAL DETECTION]: WHEN INPUT SIGNAL IS DETECTED AT HDMI1 TERMINAL, POWER IS AUTOMATICALLY TURNED ON. IF THIS IS SET, STANDBY POWER INCREASES.

PLEASE SET AFTER CONSIDERING USE ENVIRONMENT.

DP3

SET START METHOD FOR AUTO POWER-ON.

[COUPLING DETECTION]: WHEN CABLE IS COUPLED TO HDMI1 TERMINAL, POWER IS AUTOMATICALLY TURNED ON.

[SIGNAL DETECTION]: WHEN INPUT SIGNAL IS DETECTED AT HDMI1 TERMINAL, POWER IS AUTOMATICALLY TURNED ON. IF THIS IS SET, STANDBY POWER INCREASES.

PLEASE SET AFTER CONSIDERING USE ENVIRONMENT.

DP3

THIS SETTING IS ENABLED AFTER POWER IS TURNED OFF.

DP5

DISPLAY METHOD, DISPLAY DEVICE, AND NON-TRANSITORY COMPUTER-READABLE STORAGE MEDIUM STORING INFORMATION PROCESSING PROGRAM

The present application is based on, and claims priority from JP Application Serial Number 2024-048998, filed Mar. 26, 2024, the disclosure of which is hereby incorporated by reference herein in its entirety.

BACKGROUND

1. Technical Field

The present disclosure relates to a display method, a display device, and a non-transitory computer-readable storage medium storing an information processing program.

2. Related Art

There has been known a technique of detecting whether an input terminal for a video signal installed in a projection system is coupled to an external device and controlling power supply to the projection system according to a result of the detection.

For example, JP-A-2016-161916 discloses a display device including an input terminal that is coupled to an external device and inputs a signal to be projected from the external device by a projection system and a system controller that detects whether the external device is coupled to the input terminal and controls power supply to the projection system according to a result of the detection.

JP-A-2016-161916 is an example of the related art.

As a condition for supplying electric power to the projection system, besides a condition concerning whether the input terminal for the video signal is coupled to the external device as disclosed in JP-A-2016-161916, a condition concerning whether the video signal is input to the input terminal is sometimes used. Standby power of the display device changes according to which condition is used. In recent years, a demand for suppressing standby power of a display device has been increasing. However, such a demand is not considered in JP-A-2016-161916.

SUMMARY

According to an aspect of the present disclosure, there is provided a display method in a display device, including: displaying an explanation screen including explanation of a first mode for starting in response to a first trigger and explanation of a second mode for in response to a second trigger different from the first trigger; and displaying a setting screen for receiving setting of one of the first mode and the second mode after displaying the explanation screen, wherein the explanation screen includes at least one of explanation concerning power consumption of the display device in the first mode and explanation concerning power consumption of the display device in the second mode.

According to an aspect of the present disclosure, there is provided a display device including a processor configured to control: displaying an explanation screen including explanation of a first mode for starting the display device in response to a first trigger and explanation of a second mode for starting the display device in response to a second trigger different from the first trigger; and displaying a setting n for receiving setting of one of the first mode and the second mode after displaying the explanation screen, wherein the explanation screen includes at least one of explanation concerning power consumption of the display device in the first mode and explanation concerning power consumption of the display device in the second mode.

According to an aspect of the present disclosure, there is provided a non-transitory computer-readable storage medium storing an information processing program, the information processing program causing a computer to execute: causing a display device to display an explanation screen including explanation of a first mode for starting the display device in response to a first trigger and explanation of a second mode for starting the display device in response to a second trigger different from the first trigger; and causing the display device to display a setting screen for receiving setting of one of the first mode and the second mode after displaying the explanation screen, wherein the explanation screen includes at least one of explanation concerning power consumption of the display device in the first mode and explanation concerning power consumption of the display device in the second mode.

DESCRIPTION OF EMBODIMENTS

Figure 1:
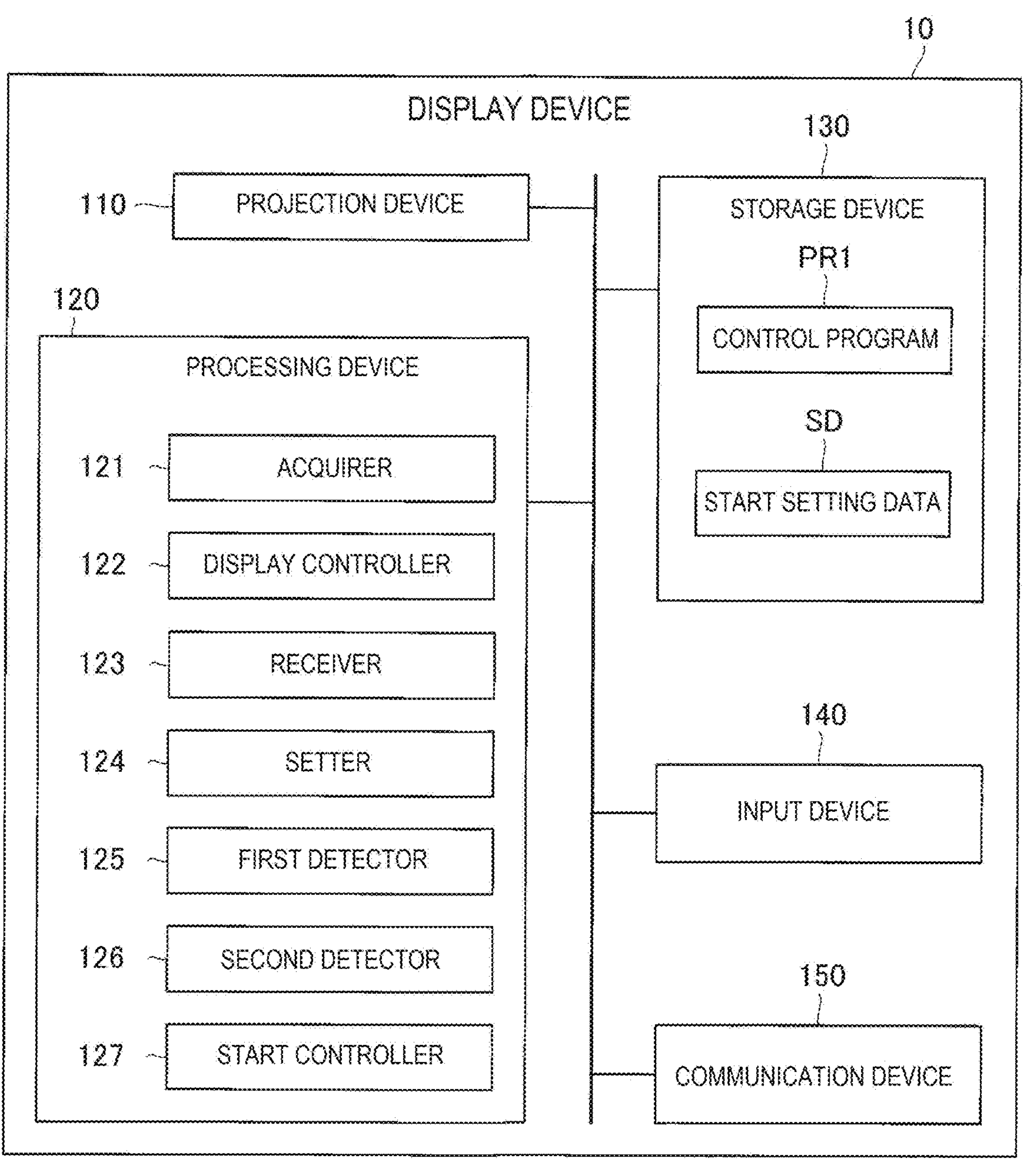
FIG. 1 is a block diagram illustrating a configuration example of a display device.

A mode for carrying out the present disclosure is explained below with reference to the drawings. In the drawings, dimensions and scales of units are differentiated from actual ones as appropriate. An embodiment explained below is a preferred specific example of the present disclosure. Therefore, technically preferable various limitations are added to the embodiment. However, the scope of the present disclosure is not limited to the embodiment unless there is particularly a description to the effect that the present disclosure is limited.

1: First Embodiment

1-1: Configuration of the Embodiment

FIG. 1 is a block diagram illustrating a configuration example of a display device 10 according to the present embodiment. In the following explanation, for convenience of explanation, an example in which the display device 10 is a projector is explained. However, as explained below, the display device 10 is not limited to the projector.

The display device 10 includes a projection device 110, a processing device 120, a storage device 130, an input device 140, and a communication device 150. The elements of the display device 10 are coupled to one another by a single bus or a plurality of buses for communicating information. The elements of the display device 10 include a single or a plurality of devices. A part of the elements of the display device 10 may be omitted.

The projection device 110 is a device that projects a video indicated by a video signal acquired by an acquirer 121 explained below onto a projection target such as a screen or a wall. The video may be a still image or may be a moving image. The projection device 110 projects various videos under control by the processing device 120. The projection device 110 includes, for example, a light source, a liquid crystal panel, and a projection lens, modulates light from the light source using the liquid crystal panel, and projects the modulated light onto the screen, the wall, or the like via the projection lens.

The processing device 120 is a processor that controls the entire display device 10. The processing device 120 includes, for example, a single chip or a plurality of chips. The processing device 120 includes, for example, a central processing unit (CPU) including an interface with a peripheral device, an arithmetic device, and a register. A part or all of the functions of the processing device 120 may be implemented by hardware such as a DSP, an ASIC, a PLD, or an FPGA. The processing device 120 executes various kinds of processing in parallel or in sequence.

The storage device 130 is an example of a recording medium readable by the processing device 120 and stores a plurality of programs including a control program PR1 to be executed by the processing device 120. The storage device 130 may include at least one of, for example, a ROM, an EPROM, an EEPROM, and a RAM. The storage device 130 may be called register, cache, main memory, main storage device, or the like. The control program PR1 may be stored in a recording medium independent of the display device 10, such as a compact disc read only memory (CD-ROM).

The storage device 130 stores start setting data SD. The start setting data SD is data in which a start method for the display device 10 is set. In the present embodiment, the start setting data SD includes data concerning an automatic start method for the display device 10. Content of specific setting in the start setting data SD is explained below.

The input device 140 is a device that receives operation from a user of the display device 10. For example, the input device 140 suitably includes buttons. When the input device 140 includes the buttons, the input device 140 includes a selection button for selecting an item and a determination button for determining input of an item selected by the user with the selection button. It is suitable that these buttons are installed in a housing of the display device 10.

Alternatively, the input device 140 may be a pointing device such as a keyboard, a touch pad, a touch panel, or a mouse.

The communication device 150 is hardware serving as a transmission and reception device for communicating with other devices. The communication device 150 is also called, for example, network device, network controller, network card, or communication module. The communication device 150 includes a connector for wired connection and may include an interface circuit corresponding to the connector. The communication device 150 may include a wireless communication interface. Examples of the connector for wired connection and the interface circuit include those conforming to a wired LAN, IEEE1394, and USB. Examples of the wireless communication interface include those conforming to a wireless LAN and Bluetooth (registered trademark).

The processing device 120 functions as an acquirer 121, a display controller 122, a receiver 123, a setter 124, a first detector 125, a second detector 126, and a start controller 127 by reading the control program PR1 from the storage device 130 and executing the control program PR1. Note that the control program PR1 may be transmitted, via a communication network, from another device such as a server that manages the display device 10.

The acquirer 121 acquires a video signal from an external device. The acquirer 121 may acquire, from the external device, a control signal for controlling the display device 10.

The display controller 122 causes the projection device 110 to project a projection image corresponding to the video signal acquired by the acquirer 121 onto a projection target such as a wall or a screen to display a display image on the projection target. The display image includes a user interface for the user of the display device 10 to perform setting concerning start of the display device 10.

The receiver 123 receives the user's input to the user interface displayed by the display controller 122. The receiver 123 receives, for example, input corresponding to content of operation performed on the input device 140 by the user.

FIGS. 2 to 7 are examples of display screens serving as user interfaces projected onto a projection target and displayed by the display controller 122.

Figure 2:
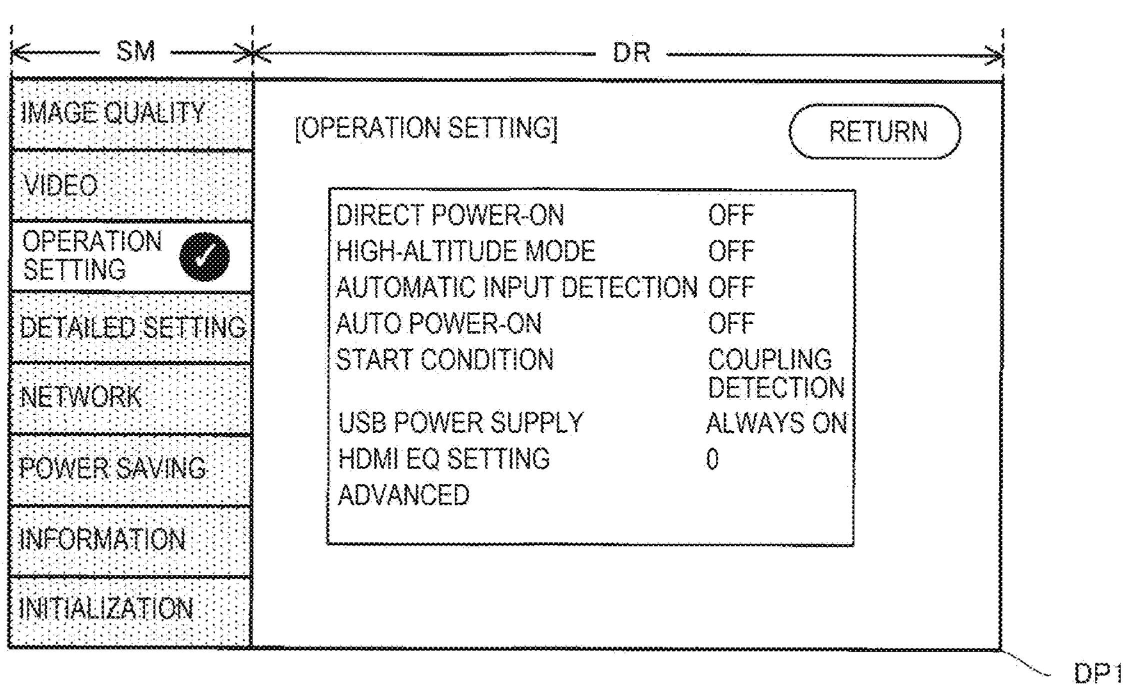
FIG. 2 is an example of a display screen serving as a user interface.

FIG. 2 illustrates an example of a first display screen DP1 displayed when an operation of the display device 10 is set. A setting menu SM for selecting a setting item is arranged at the left end on the first display screen DP1. On the right side of the setting menu SM, a display region DR where content of an item selected from the setting menu SM by the user is displayed is arranged.

The first display screen DP1 is an example of a screen that is displayed first when the user clicks an icon of "operation setting" from the setting menu SM. In the display region DR of the first display screen DP1, setting contents at the present point in time of a plurality of small items included in a large item "operation setting" are displayed. In the example illustrated in FIG. 2, an item "auto power-on" and an item "start condition" are displayed as the plurality of small items.

The "auto power-on" is an item for setting whether to automatically start the display device 10 when some equipment or device is coupled to the display device 10. As illustrated in FIG. 2, when the item "auto power-on" is set to the "OFF", the display device 10 is not automatically started even if any equipment or device is coupled to the display device 10. On the other hand, when the item "auto power-on" is set to anything other than the "OFF", the display device 10 is automatically started when some equipment or device is coupled to the display device 10.

The "start condition" is an item for setting, when the "auto power-on" is set to anything other than the "OFF", what kind of a condition is satisfied to automatically start the display device 10. In the example illustrated in FIG. 2, the display device 10 is set to be automatically started when a condition "coupling detection" is satisfied. Specific content of the "coupling detection" is explained below.

For convenience of explanation, in the example illustrated in FIG. 2, both of the item “auto power-on” and the item “start condition” are illustrated in black. However, when the item “auto power-on” is set to the “OFF”, it is suitable that the item “start condition” is not displayed or grayed out and cannot be set.

Here, it is assumed that the user performs operation of selecting the item “auto power-on” in the display region DR on the first display screen DP1 illustrated in FIG. 2 by using the input device 140. When the receiver 123 receives input of the user corresponding to the operation, the display controller 122 causes the projection device 110 to display a second display screen DP2 in FIG. 3 on the projection target. In the display region DR of the second display screen DP2, a plurality of small items serving as selection targets included in the large item “auto power-on” are displayed. In the example illustrated in FIG. 3, an item “OFF”, an item “HDMI1”, an item “computer”, and an item “USB Display” are displayed as the plurality of small items. Note that “HDMI” is a registered trademark.

The “OFF” is an item for setting stopping the function of “auto power-on”. The “HDMI1” is an item for setting the display device 10 being automatically started when an HDMI cable via an external device and the display device 10 is electrically coupled to an HDMI1 terminal installed in the display device 10. The “computer” is an item for setting the display device 10 being automatically started when a computer serving as a control device of the display device 10 is coupled to the display device 10. The “USB Display” is an item for setting the display device 10 being automatically started when a USB memory is coupled to a USB terminal installed in the display device 10. In this case, the display device 10 functions as a USB display that displays a video stored in the USB memory. The user selects any one of the “OFF”, the “HDMI1”, the “computer”, and the “USB Display” displayed in the display region DR using the input device 140. In the example illustrated in FIG. 3, only a box on the left of the “OFF” is blackened and boxes on the left of the other items are outlined. This indicates that the item “OFF” is selected in an initial state. The initial state indicates a state in which at least the setting concerning the “auto power-on” is in a state at the time of shipment of the display device 10, that is, a so-called default state. The initial state may indicate a state in which the display device 10 has been reset and returned to the state at the time of shipment.

Figure 3:
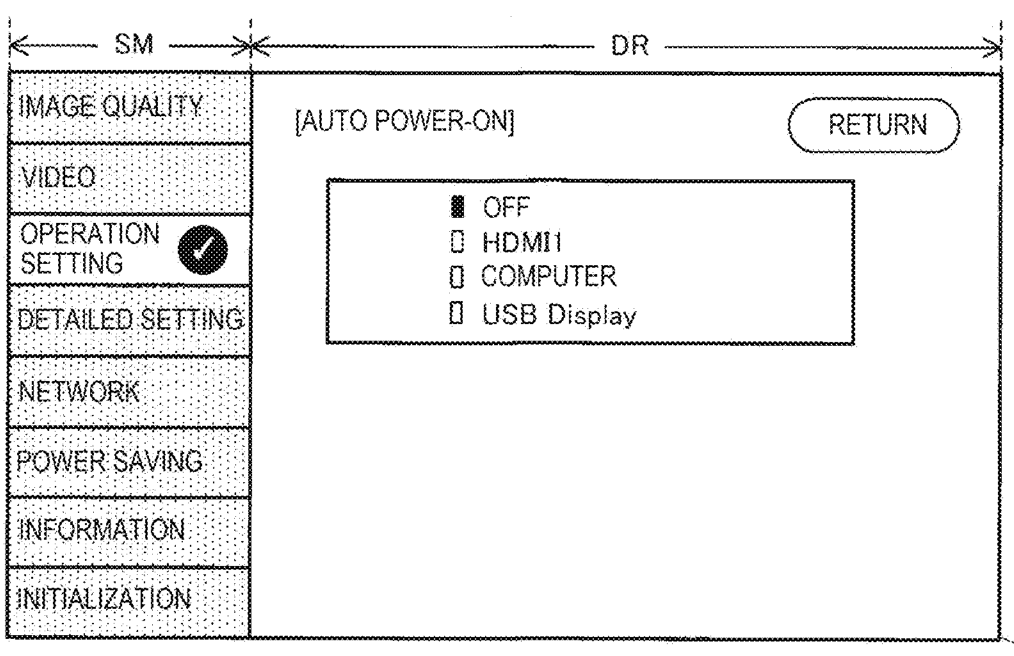
FIG. 3 is an example of a display screen serving as a user interface.

Here, it is assumed that the user performs operation of selecting the item “HDMI1” in the display region DR on the second display screen DP2 illustrated in FIG. 3 by using the input device 140. When the receiver 123 receives the input of the user corresponding to the operation, the display controller 122 causes the projection device 110 to display a third display screen DP3 in FIG. 4 on the projection target. On the third display screen DP3, explanatory notes of items selected by the user on a fourth display screen DP4 displayed next to the third display screen DP3 are displayed.

The third display screen DP3 includes an image for explaining that the item “coupling detection” to be selected on the fourth display screen DP4 is an item for setting “when it is detected that the HDMI cable has been coupled to the HDMI1 terminal, the display device 10 is automatically started”.

The third display screen DP3 includes an image for explaining that an item “signal detection” to be selected on the fourth display screen DP4 is an item for setting “when it is detected that a video signal is input to the display device 10 via the HDMI1 terminal after the HDMI cable is coupled to the HDMI1 terminal, the display device 10 is automatically started”.

The third display screen DP3 includes an image for explaining that power consumption of the display device 10 during standby is larger when the user has selected the “signal detection” than when the user has selected the “coupling detection” on the fourth display screen DP4. In the present embodiment, it is explained by a message that the power consumption during the standby of the display device 10 is larger when the user has selected the “signal detection” than when the user has selected the “coupling detection”. The message is an example of an image. The explanation may be performed using an image having a design that allows the user to grasp that the power consumption of the display device 10 during standby is relatively large.

The third display screen DP3 includes an image for prompting, according to a use environment of the display device 10, in other words, an aspect in which the display device 10 is used, the user to select the item “coupling detection” or select the item “signal detection”. The use environment of the display device 10 is, for example, a power capacity of a room in which the display device 10 is installed or a building including the room and the temperature of the room. Therefore, for example, when the user desires to operate the display device 10 with low power consumption considering the power capacity, it is possible to, such that the “coupling detection” is selected, guide the user who has referred to the third display screen DP3. When the user has selected the “signal detection”, the power consumption of the display device 10 during standby is larger than when the user has selected the “coupling detection”. Therefore, an amount of exhaust heat of the display device 10 also increases. Therefore, for example, when the user does not desire to increase the temperature of the room from the present state, it is possible to, such that the “coupling detection” is selected, the user who has referred to the third display screen DP3.

The image included in the third display screen DP3 includes words. For example, the image included in the third display screen DP3 includes words for prompting, according to an aspect in which the display device 10 is used, the user to select the item “coupling detection” or select the item “signal detection”.

Figures 4, 5:
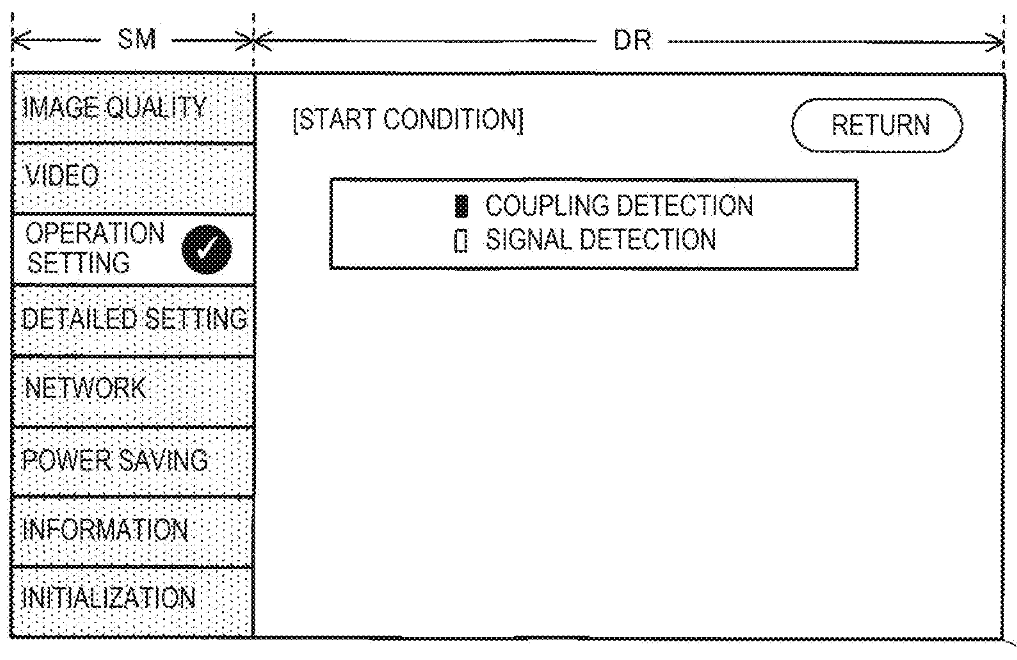
FIG. 4 is an example of a display screen serving as a user interface.
FIG. 5 is an example of a display screen serving as a user interface.

The third display screen DP3 illustrated in FIG. 4 is merely an example. The third display screen DP3 may include words or images other than the words illustrated in FIG. 4.

In the third display screen DP3, the item “coupling detection” includes an image for explaining that the item is an item for setting “when it is detected that an HDMI cable has been coupled to the HDMI1 terminal, the display device 10 is automatically started” as explained above. Here, “it is detected that the HDMI cable has been coupled to the HDMI1 terminal” is an example of a “first trigger”. As explained below, the “first trigger” is not limited to “it is detected that the HDMI cable has been coupled to the HDMI1 terminal”. An “operation mode in which the display device 10 is automatically started in response to the “first trigger”” is an example of a “first mode”. That is, the third display screen DP3 includes explanation of the first mode for starting the display device 10 in response to the first trigger.

In the example illustrated in FIG. 4, the third display screen DP3 includes an image for explaining that the first trigger is “it is detected that the HDMI cable has been coupled to the HDMI1 terminal". However, the third display screen DP3 may include other expression as the explanation of the first trigger. For example, the third display screen DP3 may include explanation that the "first trigger" is "coupling between the display device 10 and an external device (a transmission device) that transmits a video signal to the display device 10". The "video signal" is an example of a "signal".

In the third display screen DP3, the item "signal detection" includes an image for explaining that the item is an item for setting "when it is detected that a video signal is input to the display device 10 via the HDMI1 terminal after the HDMI cable has been coupled to the HDMI1 terminal, the display device 10 is automatically started" as explained above. Here, "it is detected that a video signal is input to the display device 10" is an example of a "second trigger". As explained below, the "second trigger" is not limited to "it is detected that a video signal is input to the display device 10". The "video signal" is an example of a "signal". An "operation mode in which the display device 10 is automatically started in response to the "second trigger" is an example of a "second mode". That is, the third display screen DP3 includes explanation of the second mode for starting the display device 10 in response to the second trigger.

As explained above, in the example illustrated in FIG. 4, the third display screen DP3 includes explanation that the "second trigger" is "detection of a video signal by the display device 10".

As explained above, the third display screen DP3 includes an image for explaining that power consumption of the display device 10 during standby is larger when the user has selected the "signal detection" than when the user has selected the "coupling detection". The third display screen DP3 of the present embodiment displays, as the image, a message "The standby power increases when set here." is displayed. Here, "the power consumption of the display device 10 during standby is larger when the user has selected the "signal detection" than when the user has selected the "coupling detection"" is an example of "explanation concerning power consumption of the display device 10 in the second mode". The third display screen DP3 may include other explanation concerning power consumption. For example, it is suitable that the third display screen DP3 includes at least one of the explanation concerning the power consumption of the display device 10 in the first mode and the explanation concerning the power consumption of the display device 10 in the second mode. More specifically, the third display screen DP3 may include a specific numerical value of at least one of the power consumption of the display device 10 during standby in the first mode and the power consumption of the display device 10 during standby in the second mode.

The third display screen DP3 is an example of an "explanation screen".

The display controller 122 causes the projection device 110 to display the third display screen DP3 on the projection target for a predetermined time set in advance and thereafter displays the fourth display screen DP4 illustrated in FIG. 5. In the display region DR of the fourth display screen DP4, a plurality of small items serving as selection targets included in the large item "start condition" are displayed. In the example illustrated in FIG. 5, the item "coupling detection" and the item "signal detection" are displayed as the plurality of small items.

As explained above, the "coupling detection" is an item for setting "when it is detected that the HDMI cable has been coupled to the HDMI1 terminal, the display device 10 is automatically started". As explained above, the "signal detection" is an item for setting "when it is detected that a video signal is input to the display device 10 via the HDMI1 terminal after the HDMI cable has been coupled to the HDMI1 terminal, the display device 10 is automatically started".

In the present disclosure, "coupling" means electrical coupling. The "coupling" in the present disclosure does not include, for example, "although the HDMI cable has been coupled to the HDMI1 terminal, power is not input from the HDMI cable to the HDMI1 terminal because the HDMI1 cable is disconnected".

The fourth display screen DP4 is a display screen for the receiver 123 to receive input indicating that one of the item "coupling detection" and the item "signal detection" has been selected based on operation of the input device 140 by the user. In other words, the fourth display screen DP4 is a display screen for the receiver 123 to receive setting one of the first mode and the second mode.

In the example illustrated in FIG. 5, a box on the left of the item "coupling detection" is blackened and a box on the left of the item "signal detection" is outlined. This indicates that the item "coupling detection" is selected in the initial state. In other words, the fourth display screen DP4 is displayed in a form indicating that the display device 10 operates in the first mode in the initial state. The form indicating that the display device 10 operates in the first mode in the initial state may be displaying a message such as "auto power-on is currently set to coupling detection" on the fourth display screen DP4. That is, a display form is not particularly limited if the display form is a form in which it can be notified to the user to which of the "signal detection" or the "coupling detection" the auto power-on is set in a default state of the display device 10.

The fourth display screen DP4 is an example of a "setting screen".

The large item of the fourth display screen DP4 is "start condition". As explained above, in the display region DR of the first display screen DP1 illustrated in FIG. 2, the item "start condition" can be set only after the item "auto power-on" becomes anything other than the "OFF". As explained above with reference to FIGS. 2 to 5, when the user has selected the "HDMI1" on the second display screen DP2 in FIG. 3 for setting the item "auto power-on", a flow for setting the item "start condition" is performed on the fourth display screen DP4 in FIG. 5.

Here, it is assumed that the user has performed operation of selecting one of the items "coupling detection" and "signal detection" in the display region DR on the fourth display screen DP4 illustrated in FIG. 5 by using the input device 140. When the receiver 123 receives the operation, the display controller 122 causes the projection device 110 to display the fifth display screen DP5 in FIG. 6 on the projection target. On the fifth display screen DP5, an image for explaining that setting on the fourth display screen DP4 is enabled after the display device 10 is turned off is displayed.

Figures 6, 7:
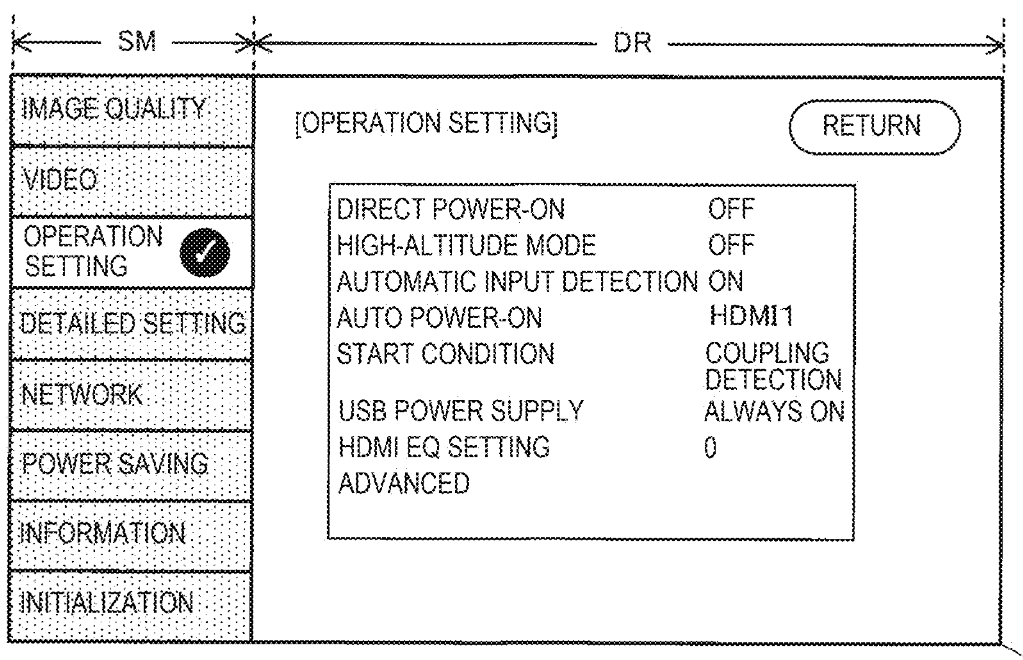
FIG. 6 is an example of a display screen serving as a user interface.
FIG. 7 is an example of a display screen serving as a user interface.

FIG. 7 is an example of a sixth display screen DP6 displayed when the user clicks the icon of "operation setting" from the setting menu SM when the item "auto power-on" is already set to the "HDMI1". In the display region DR of the sixth display screen DP6 illustrated in FIG. 7, it is displayed that the item "auto power-on" is set to the "HDMI1" and the item "start condition" is set to the "coupling detection".

Here, it is assumed that the user performs operation of selecting the item "start condition" in the display region DR on the sixth display screen DP6 by using the input device 140 in order to change the item "start condition" to the "signal detection". When the receiver 123 receives input of the user corresponding to the operation, the display controller 122 causes the projection device 110 to display the fourth display screen DP4 in FIG. 5 on the projection target.

It is assumed that the user has performed operation of selecting one of the items "coupling detection" and "signal detection" in the display region DR on the fourth display screen DP4 illustrated in FIG. 5 by using the input device 140. When the receiver 123 receives input of the user corresponding to the operation, the display controller 122 causes the projection device 110 to display the fifth display screen DP5 in FIG. 6 on the projection target.

In FIG. 1, the setter 124 sets, based on the user's input to the user interface received by the receiver 123, content of the start setting data SD stored in the storage device 130.

For example, as explained above, when the receiver 123 receives the input of the user corresponding to the operation of selecting the "coupling detection" in the display region DR on the fourth display screen DP4, the setter 124 sets an operation mode at the present point in time defined in the start setting data SD to the first mode. Specifically, the setter 124 updates the operation mode at the present point in time defined in the start setting data SD to "an operation mode in which the display device 10 is automatically started when it is detected that the HDMI cable has been coupled to the HDMI1 terminal".

On the other hand, when the receiver 123 receives the user's input corresponding to operation of selecting the "signal detection" in the display region DR on the fourth display screen DP4, the setter 124 sets the operation mode at the present point in time defined in the start setting data SD to the second mode. Specifically, the setter 124 updates the operation mode at the present point in time defined in the start setting data SD to "an operation mode in which the display device 10 is automatically started when it is detected that the HDMI cable has been coupled to the HDMI1 terminal and a video signal is input to the display device 10 via the HDMI1 terminal".

The first detector 125 executes detection in the first trigger. As an example, the first detector 125 detects that "the HDMI cable has been coupled to the HDMI1 terminal". More specifically, as the detection of "the HDMI cable has been coupled to the HDMI1 terminal", the first detector 125 executes, as the first trigger, detection of "power having a voltage equal to or higher than a predetermined value set in advance has been input from the HDMI1 terminal".

The second detector 126 executes detection in the second trigger. As an example, the second detector 126 executes, as the second trigger, detection of "a video signal is input to the display device 10 via the HDMI1 terminal".

In the case explained above, electric power required for the detection in the second trigger is higher than electric power required for the detection in the first trigger. This is because, in order to detect that "a video signal is input to the display device 10 via the HDMI1 terminal", it is necessary to start an analysis device that analyzes the video signal input via the HDMI1 terminal and electric power required to drive the analysis device is larger than electric power required to detect a voltage of electric power input to the HDMI1 terminal. Therefore, in the present embodiment, the power consumption of the display device 10 during standby is larger when the user has selected the "signal detection" than when the user has selected the "coupling detection". The third display screen DP3 notifies the event explained above to the user by including an image for explaining that the power consumption of the display device 10 during standby is larger when the user has selected the "signal detection" than when the user has selected the "coupling detection".

The start controller 127 controls start processing for the display device 10 in response to the first trigger or the second trigger by referring to the start setting data SD.

More specifically, when the operation mode at the present point in time defined by the start setting data SD is the first mode, the start controller 127 starts the display device 10 in response to the first trigger. On the other hand, when the operation mode at the present point in time defined by the start setting data SD is the second mode, the start controller 127 starts the display device 10 in response to the second trigger.

When the first trigger is detecting "the HDMI cable has been coupled to the HDMI1 terminal", in the first mode, the light source provided in the projection device 110 illuminates the projection target according to the start of the display device 10 by the start controller 127. In this case, for example, white light or an image of a single color of blue is projected onto the projection target.

On the other hand, when the second trigger is "it is detected that a video signal is input to the display device 10", in the second mode, a projection image corresponding to the video signal input to the display device 10 is projected onto the projection target according to the start of the display device 10 by the start controller 127.

1-2: Operation in the Embodiment

1-2-1: Operation of Display Control

Figure 8:
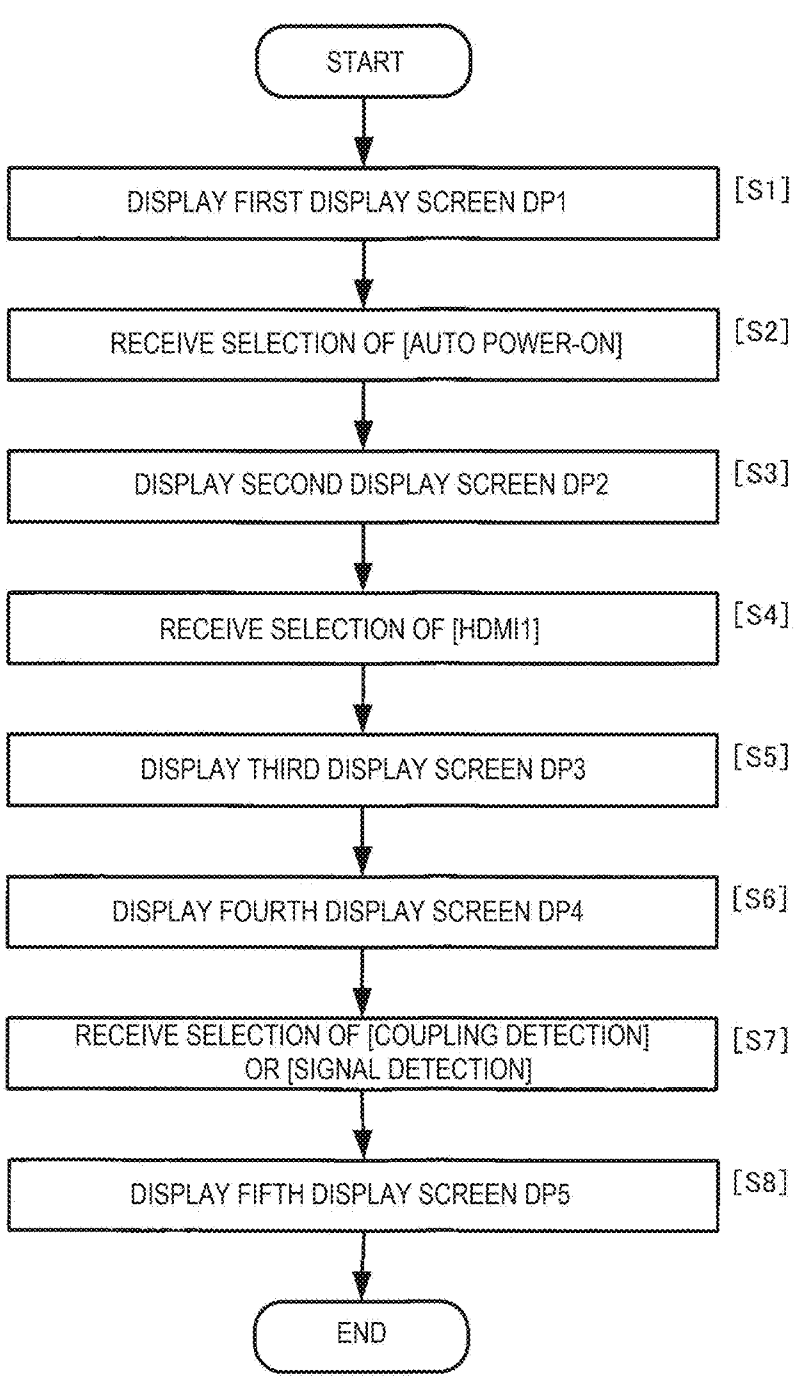
FIG. 8 is a flowchart illustrating an operation of display control by the display device.
Figure 9:
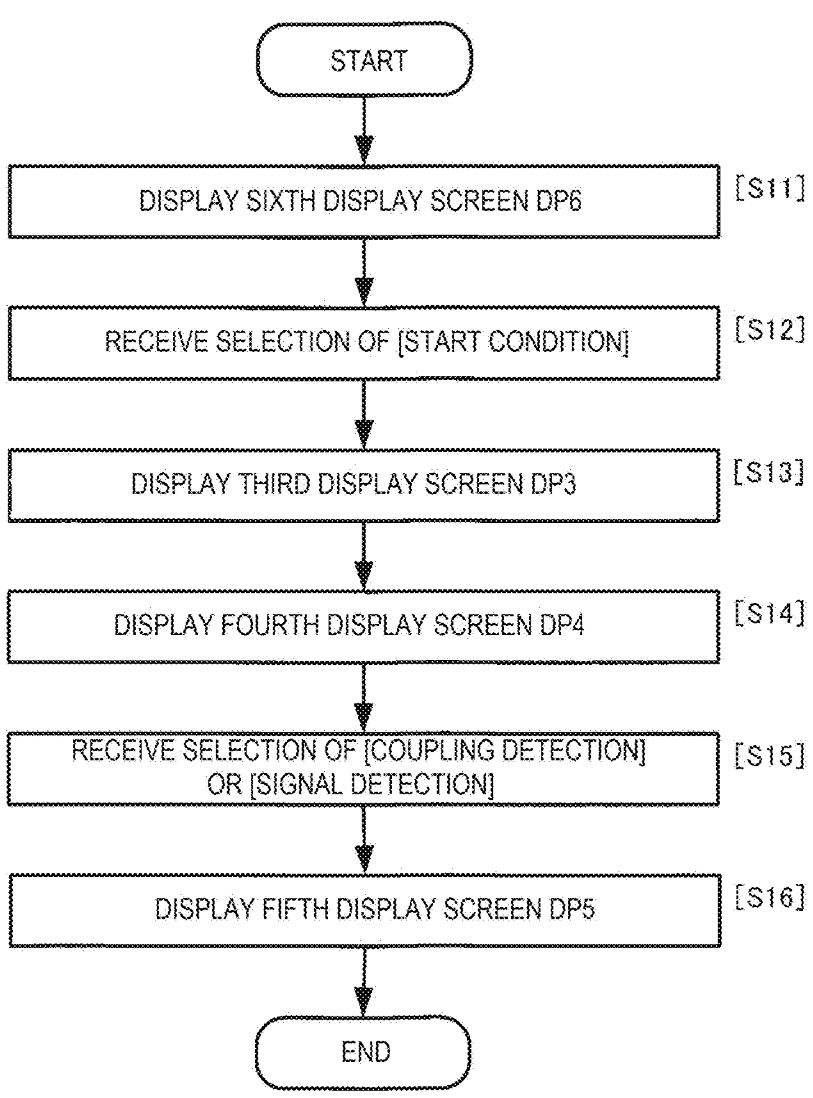
FIG. 9 is a flowchart illustrating an operation of display control by the display device.

FIGS. 8 and 9 are flowcharts illustrating operations of display control by the display device 10. In the following explanation, for convenience of explanation, an example in which contents of the first display screen DP1 to the sixth display screen DP6 are the contents explained above with reference to FIGS. 2 to 7 is explained. However, the contents of the first display screen DP1 to the sixth display screen DP6 are not limited to the example explained below.

1-2-1-1: Operation of First Display Control

FIG. 8 is a flowchart illustrating an operation of first display control by the display device 10. The operation of the first display control is an operation in the case in which the item "auto power-on" is set to the "OFF" in the initial state.

In step S1, the processing device 120 functions as the display controller 122. The processing device 120 causes the projection device 110 to display the first display screen DP1 on the projection target by projecting a projection image showing the first display screen DP1 illustrated in FIG. 2 onto the projection target.

In step S2, it is assumed that the user has selected the item "auto power-on" displayed in the display region DR of the first display screen DP1. The processing device 120 functions as the receiver 123. The processing device 120 receives input indicating selection of the item "auto power-on" by the user.

In step S3, the processing device 120 functions as the display controller 122. The processing device 120 causes the projection device 110 to display the second display screen DP2 on the projection target by projecting a projection image showing the second display screen DP2 illustrated in FIG. 3 onto the projection target.

In step S4, it is assumed that the user has selected the item "HDMI1" displayed in the display region DR of the second display screen DP2. The processing device 120 functions as the receiver 123. The processing device 120 receives input indicating selection of the item "HDMI1" by the user.

In step S5, the processing device 120 functions as the display controller 122. The processing device 120 causes the projection device 110 to display the third display screen DP3 on the projection target by projecting a projection image showing the third display screen DP3 illustrated in FIG. 4 onto the projection target.

In step S6, the processing device 120 functions as the display controller 122. After a predetermined time set in advance has elapsed since the processing in step S5 was executed. The processing device 120 causes the projection device 110 to display the fourth display screen DP4 on the projection target by projecting a projection image showing the fourth display screen DP4 illustrated in FIG. 5 onto the projection target.

In step S7, it is assumed that the user has selected the item "coupling detection" or "signal detection" displayed in the display region DR of the fourth display screen DP4. The processing device 120 functions as the receiver 123. The processing device 120 receives input indicating the selection of the item "coupling detection" or "signal detection" by the user.

When the processing device 120 functions as the receiver 123 and receives the input indicating the selection of the item "coupling detection" or "signal detection" by the user, the processing device 120 functions as the setter 124. The processing device 120 updates, according to the input of the user received by functioning as the receiver 123, the content of the start setting data SD stored in the storage device 130.

In step S8, the processing device 120 functions as the display controller 122. The processing device 120 causes the projection device 110 to display the fifth display screen DP5 on the projection target by projecting a projection image showing the fifth display screen DP5 illustrated in FIG. 6 onto the projection target.

1-2-1-2: Operation of Second Display Control

FIG. 9 is a flowchart illustrating an operation of second display control by the display device 10. The operation of the second display control is an operation in the case in which the item "auto power-on" is set to the "HDMI1" in advance in the initial state.

In step S11, the processing device 120 functions as the display controller 122. The processing device 120 causes the projection device 110 to display the six display screen DP6 on the projection target by projecting a projection image showing the sixth display screen DP6 illustrated in FIG. 7 onto the projection target.

In step S12, it is assumed that the user has selected the item "start condition" illustrated in the display region DR of the sixth display screen DP6. The processing device 120 functions as the receiver 123. The processing device 120 receives input indicating the selection of the item "start condition" by the user.

In step S13, the processing device 120 functions as the display controller 122. The processing device 120 causes the projection device 110 to display the third display screen DP3 on the projection target by projecting a projection image showing the third display screen DP3 illustrated in FIG. 4 onto the projection target.

In step S14, the processing device 120 functions as the display controller 122. After a predetermined time set in advance has elapsed since the processing in step S13 was executed. The processing device 120 causes the projection device 110 to display the fourth display screen DP4 on the projection target by projecting a projection image showing the fourth display screen DP4 illustrated in FIG. 5 onto the projection target.

In step S15, it is assumed that the user has selected the item "coupling detection" or "signal detection" displayed in the display region DR of the fourth display screen DP4. The processing device 120 functions as the receiver 123. The processing device 120 receives input indicating the selection of the item "coupling detection" or "signal detection" by the user.

When the processing device 120 functions as the receiver 123 and receives the input indicating the selection of the item "coupling detection" or "signal detection" by the user, the processing device 120 functions as the setter 124. The processing device 120 updates, according to the input of the user received by functioning as the receiver 123, the content of the start setting data SD stored in the storage device 130.

In step S16, the processing device 120 functions as the display controller 122. The processing device 120 causes the projection device 110 to display the fifth display screen DP5 on the projection target by projecting a projection image showing the fifth display screen DP5 illustrated in FIG. 6 onto the projection target.

1-2-2: Operation of Start Control

Figure 10:
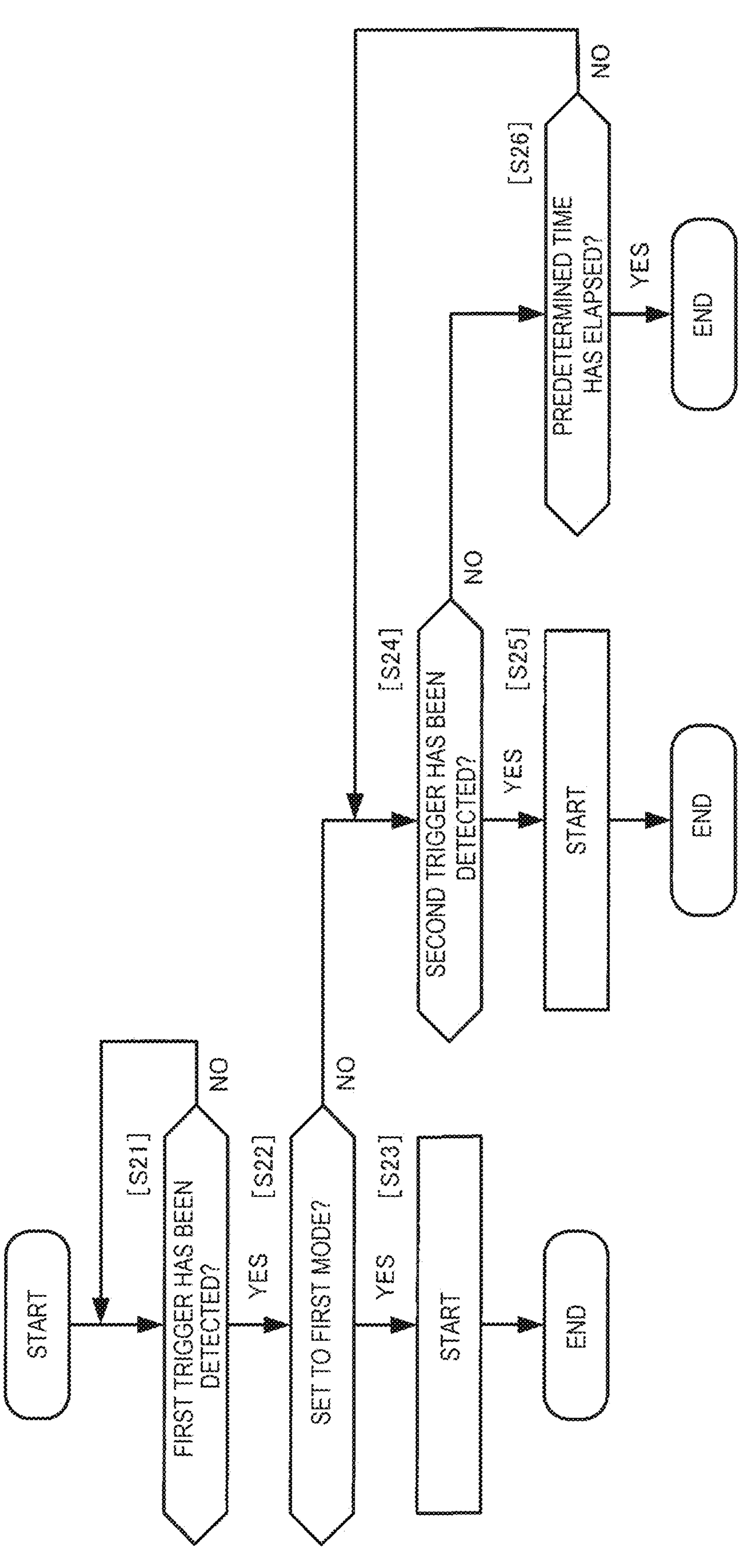
FIG. 10 is a flowchart illustrating an operation of start control by the display device.

FIG. 10 is a flowchart illustrating an operation of start control by the display device 10.

In step S21, the processing device 120 functions as the start controller 127. The processing device 120 determines whether the first detector 125 has executed detection serving as the first trigger. When the first detector 125 has executed the detection serving as the first trigger ("YES" in step S21), the processing device 120 executes processing in step S22. When the first detector 125 has not executed the detection serving as the first trigger ("NO" in step S21), the processing device 120 executes processing in step S21.

In step S22, the processing device 120 functions as the start controller 127. The processing device 120 determines whether a current operation mode is set to the first mode or set to the second mode by referring to the start setting data SD stored in the storage device 130. When the current operation mode is set to the first mode ("YES" in step S22), the processing device 120 executes processing in step S23. When the current operation mode is set to the second mode ("NO" in step S22), the processing device 120 executes processing in step S24.

In step S23, the processing device 120 functions as the start controller 127. The processing device 120 starts the display device 10.

In step S24, the processing device 120 functions as the start controller 127. The processing device 120 determines whether the second detector 126 has executed detection serving as the second trigger. When the second detector 126 has executed the detection serving as the second trigger ("YES" in step S24), the processing device 120 executes processing in step S25. When the second detector 126 has not executed the detection serving as the second trigger ("NO" in step S24), the processing device 120 executes processing in step S26.

In step S25, the processing device 120 functions as the start controller 127. The processing device 120 starts the display device 10.

In step S26, the processing device 120 functions as the start controller 127. The processing device 120 determines whether a predetermined time set in advance has elapsed. When the predetermined time has elapsed ("YES" in step S26), the processing device 120 ends all processing. Alternatively, the processing device 120 may execute the processing in step S21. When the predetermined time has not elapsed ("NO" in step S26), the processing device 120 executes the processing in step S24.

1-3: Operation in a Comparative Example

Figure 11:
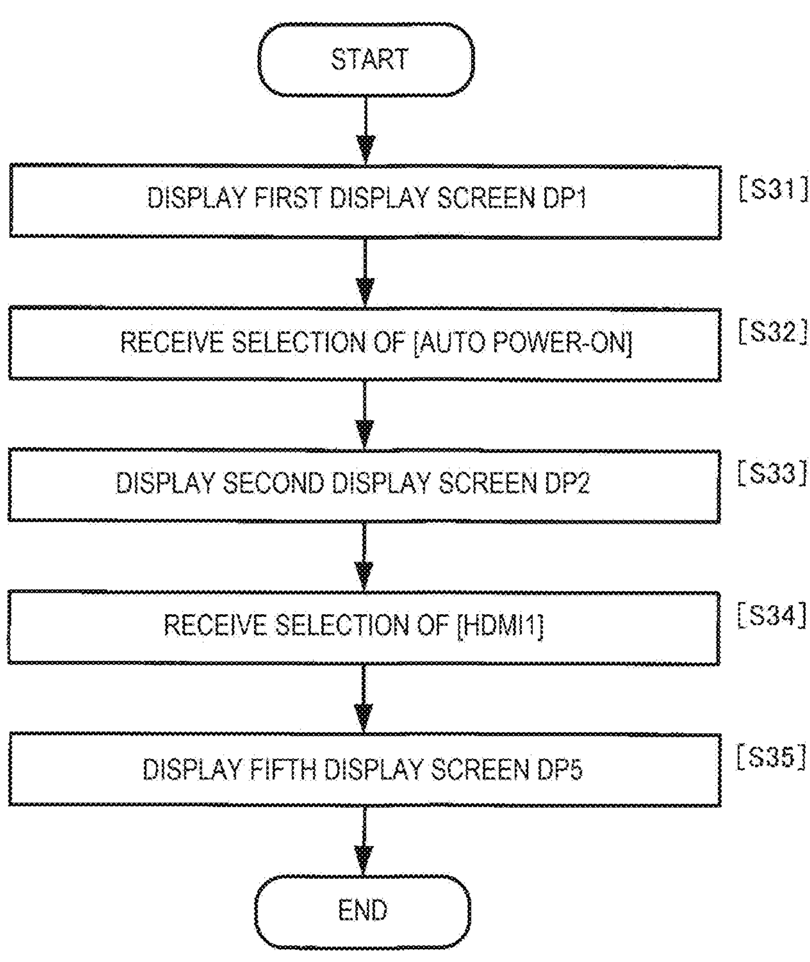
FIG. 11 is a flowchart illustrating an operation of display control by a display device according to a comparative example.
Figure 12:
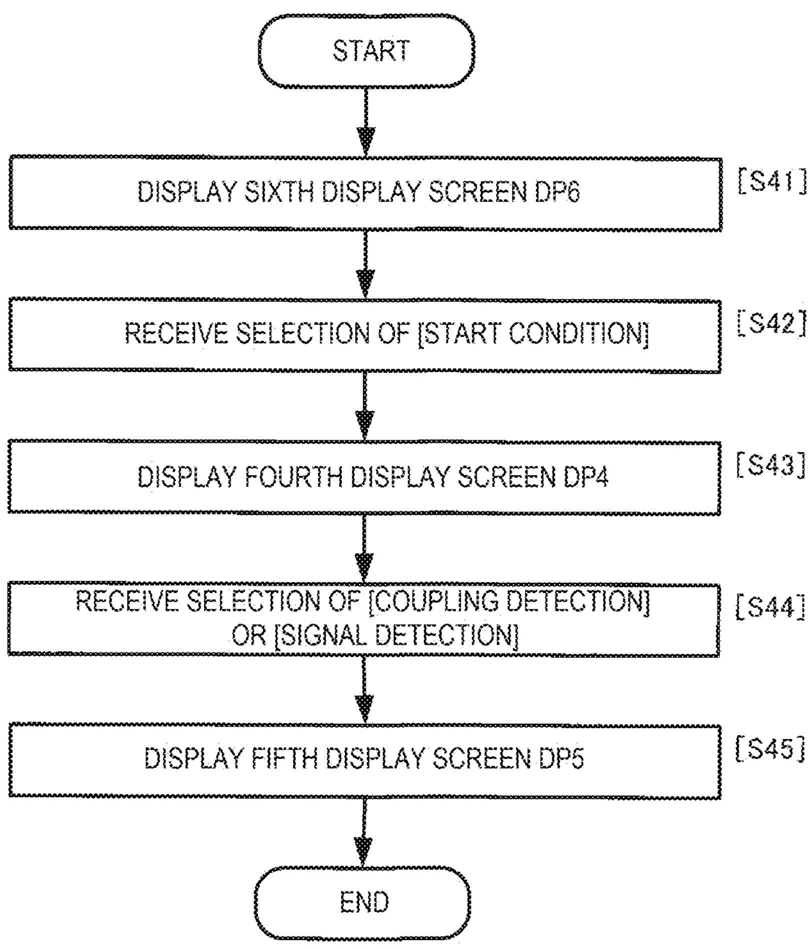
FIG. 12 is a flowchart illustrating an operation of display control by the display device according to the comparative example.

FIGS. 11 and 12 are flowcharts illustrating operations of display control by a display device according to a comparative example.

1-3-1: Operation of the Display Control 1-3-1-1: Operation of First Display Control FIG. 11 is a flowchart illustrating an operation of first display control by the display device according to the comparative example. The flowchart illustrated in FIG. 11 is a flowchart to be compared with the flowchart illustrating the operation of the first display control by the display device 10 according to the first embodiment illustrated in FIG. 8.

Steps S31 to S34 of the flowchart illustrated in FIG. 11 are the same as steps S1 to S4 of the operation of the first display control by display device 10 illustrated in FIG. 8. Step S35 of the flowchart illustrated in FIG. 11 is the same as step of the operation of the first display control by display device 10 illustrated in FIG. 8. That is, the operation of the first display control by the display device according to the comparative example does not include the processing in steps S5 to S7 of the operation of the first display control by the display device 10.

For this reason, in the display device according to the comparative example, it is not possible to set whether the display device is automatically started when it is detected that the HDMI cable is coupled to the HDMI1 terminal or when it is detected that a video signal is input.

1-3-1-2: Operation of Second Display Control

FIG. 12 is a flowchart illustrating an operation of second display control by the display device according to the comparative example. The flowchart illustrated in FIG. 12 is a flowchart to be compared with the flowchart illustrating the operation of the second display control by the display device 10 according to the first embodiment illustrated in FIG. 9.

Steps S41 and S42 of the flowchart illustrated in FIG. 12 are the same as steps S11 and S12 of the operation of the second display control by display device 10 illustrated in FIG. 9. Further, steps S43 to S45 of the flowchart illustrated in FIG. 12 are the same as steps S14 to S16 of the operation of the second display control by display device 10 illustrated in FIG. 9. That is, the operation of the second display control by the display device according to the comparative example does not include the processing in step S13 of the operation of the second display control by the display device 10.

For this reason, the user of the display device according to the comparative example cannot grasp that power consumption of the display device in the second mode is larger than power consumption of the display device in the first mode. A user of the display device according to the comparative example is not prompted to set the first mode or the second mode according to an environment in which the display device is used.

2: Modifications

The embodiment explained above can be variously modified. Specific aspects of modifications are exemplified below. The aspects exemplified below and the aspects illustrated in the embodiment explained above can be combined as appropriate within a mutually consistent range. Note that, in the modification examples exemplified below, elements having actions and functions equivalent to those in the embodiment are denoted by the reference numerals and signs referred to in the above explanation and detailed explanation of the elements is omitted as appropriate.

2-1: Modification 1

In the embodiment explained above, a case in which the display device 10 is the projector is exemplified. However, the display device 10 is not limited to the projector. The display device 10 may be, for example, a display, a tablet, or a smartphone.

2-2: Modification 2

In the embodiment explained above, a case in which the user of the display device 10 selects the "HDMI1" on the second display screen DP2 is exemplified. However, when the user of the display device 10 has selected the "computer" or the "USB Display" on the second display screen DP2, a start method may be able to be set in response to various triggers as in the embodiment explained above. In this case, it is suitable that the standby power of the display device 10 is different depending on the various triggers and the user of the display device 10 can select a start method for the display device 10 according to an aspect in which the display device 10 is used.

2-3: Modification 3

In the embodiment explained above, a case in which the "first trigger" is "it is detected that the HDMI cable has been coupled to the HDMI1 terminal" and the "second trigger" is "it is detected that a video signal is input to the display device 10" is exemplified. However, the "first trigger" and the "second trigger" may be other events being detected. For example, one of the "first trigger" and the "second trigger" may be "a computer is coupled to the display device 10". Similarly, one of the "first trigger" and the "second trigger" may be "a USB memory is coupled to the display device 10".

2-4: Modification 4

In the embodiment explained above, the first trigger and the second trigger are different in the detection target in the case in which the HDMI cable is coupled to the HDMI1 terminal of the display device 10. However, in the display device 10, the first trigger and the second trigger may be different in other points.

For example, the display device 10 may be driven using a commercial power supply or may be driven using a battery by inserting a power cable into a power outlet installed in a room. In this case, as an example, the first trigger may be use of the commercial power supply being detected and the second trigger may be use of the battery being detected. When it is determined that the display device 10 is driven by only the battery, the display controller 122 may project a display screen for explaining that the first mode is recommended onto the projection target and display the display screen on the projection target.

2-5: Modification 5

When the display device 10 is driven using the battery and it is determined that the remaining capacity of the battery is less than a first capacity set in advance, the display controller 122 may project a display screen for explaining that the first mode is recommended onto the projection target and display the display screen on the projection target.

2-6: Modification 6

In the embodiment explained above, the display controller 122 projects the first display screen DP1 to the sixth display screen DP6 illustrated in FIGS. 2 to 7 onto the projection target and displays the first display screen DP1 to the sixth display screen DP6 on the projection target. However, when the display device 10 incorporates a display used for setting the display device 10, the display controller 122 may cause the display to display the first display screen DP1 to the sixth display screen DP6 illustrated in FIGS. 2 to 7. Alternatively, when a display different from the display device 10 used for setting the display device 10 is coupled to the display device 10, the display controller 122 may cause the display to display the first display screen DP1 to the sixth display screen DP6 illustrated in FIGS. 2 to 7.

3: Summary of the Present Disclosure

A summary of the present disclosure is appended below.

(Appendix 1) A display method in a display device, the display method including: displaying an explanation screen including explanation of a first mode for starting the display device in response to a first trigger and explanation of a second mode for starting the display device in response to a second trigger different from the first trigger; and displaying a setting screen for receiving setting of one of the first mode and the second mode after displaying the explanation screen, wherein the explanation screen includes at least one of explanation concerning power consumption of the display device in the first mode and explanation concerning power consumption of the display device in the second mode.

Accordingly, the user of display device 10 can set the operation mode of display device 10 such that the standby power of the display device 10 is appropriate. More specifically, in the display method explained above, a setting screen for the operation mode is displayed after the explanation screen for the power consumption of the first mode and the second mode serving as the operation mode is displayed. As a result, the user of the display device 10 can select the first mode or the second mode after grasping the power consumption of each of the first mode and the second mode.

(Appendix 2) The display method according to the appendix 1, wherein the setting screen indicates that the display device operates in the first mode in an initial state.

Accordingly, the user of display device 10 can grasp that, in the initial state, display device 10 is started in the first mode in which the power consumption is relatively small. Since the setting screen is displayed in an aspect indicating that the display device 10 operates in the first mode in the initial state, the display device 10 can provide a display method corresponding to an ErP command.

(Appendix 3) The display method according to the appendix 1 or 2, wherein the explanation screen includes explanation indicating that power consumption of the display device in the second mode is larger than the power consumption of the display device in the first mode.

Accordingly, the user of the display device 10 can set whether to switch the setting of the display device 10 from the first mode to the second mode after grasping a magnitude relationship between the power consumption in the first mode and the power consumption in the second mode.

(Appendix 4) The display method according to any one of the appendixes 1 to 3, wherein the explanation screen includes: explanation that the first trigger is coupling between the display device and a transmission device that transmits a signal to the display device; and explanation that the second trigger is detection of the signal by the display device.

Accordingly, the user of the display device 10 can easily grasp a difference between the first mode and the second mode.

(Appendix 5) The display method according to any one of the appendixes 1 to 4, wherein the explanation screen includes an image for prompting setting the first mode or the second mode according to an aspect in which the display device is used.

Accordingly, the user of display device 10 can set the operation mode considering the power consumption in each of the first mode and the second mode and an actual usage form of display device 10.

(Appendix 6) The display method according to any one of the appendixes 1 to 5, wherein the display device is configured to be driven by at least one of a commercial power supply and a battery, and, when it is determined that the display device is driven by only the battery, the explanation screen is displayed in an aspect in which the first mode is recommended.

Accordingly, the user of the display device 10 can easily understand that it is better to set the first mode when the display device 10 is driven by only the battery.

(Appendix 7) The display method according to any one of the appendixes 1 to 6, wherein the display device is configured to be driven by a battery, and, when the display device determines that a remaining capacity of the battery is less than a first capacity, the explanation screen is displayed in an aspect in which the first mode is recommended.

Accordingly, the user of the display device 10 can easily understand that it is better to set the first mode when the remaining capacity of the battery is less than the first capacity.

(Appendix 8) A display device including a processor configured to control: displaying an explanation screen including explanation of a first mode for starting in response to a first trigger and explanation of a second mode for starting in response to a second trigger different from the first trigger; and displaying a setting screen for receiving setting of one of the first mode and the second mode after displaying the explanation screen, wherein the explanation screen includes at least one of explanation concerning power consumption of the display device in the first mode and explanation concerning power consumption of the display device in the second mode.

Accordingly, the user of display device 10 can set the operation mode of display device 10 such that the standby power of the display device 10 is appropriate. More specifically, in the display device 10, a setting screen for the operation mode is displayed after the explanation screen for the power consumption of the first mode and the second mode serving as the operation mode is displayed. As a result, the user of the display device 10 can select the first mode or the second mode after grasping the power consumption of each of the first mode and the second mode.

(Appendix 9) A non-transitory computer-readable storage medium storing an information processing program, the information processing program causing a computer to execute: causing a display device to display an explanation screen including explanation of a first mode for starting the display device in response to a first trigger and explanation of a second mode for starting the display device in response to a second trigger different from the first trigger; and causing the display device to display a setting screen for receiving setting of one of the first mode and the second mode after displaying the explanation screen, wherein the explanation screen includes at least one of explanation concerning power consumption of the display device in the first mode and explanation concerning power consumption of the display device in the second mode.

Accordingly, the user of display device 10 can set the operation mode of display device 10 such that the standby power of the display device 10 is appropriate. More specifically, in the display device 10, a setting screen for the operation mode is displayed after the explanation screen for the power consumption of the first mode and the second mode serving as the operation mode is displayed. As a result, the user of the display device 10 can select the first mode or the second mode after grasping the power consumption of each of the first mode and the second mode.

What is claimed is:

1. A display method in a display device, the display method comprising: displaying an explanation screen including explanation of a first mode for starting the display device in response to a first trigger and explanation of a second mode for starting the display device in response to a second trigger different from the first trigger; and displaying a setting screen for receiving setting of one of the first mode and the second mode after displaying the explanation screen, wherein the explanation screen includes at least one of explanation concerning power consumption of the display device in the first mode and explanation concerning power consumption of the display device in the second mode; and wherein the explanation screen includes: explanation that the first trigger is coupling between the display device and a transmission device that transmits a signal to the display device; and explanation that the second trigger is detection of the signal by the display device.

2. The display method according to claim 1, wherein the setting screen indicates that the display device operates in the first mode in an initial state.

3. The display method according to claim 1, wherein the explanation screen includes explanation indicating that power consumption of the display device in the second mode is larger than the power consumption of the display device in the first mode.

4. The display method according to claim 3, wherein the explanation screen includes an image for prompting setting the first mode or the second mode according to an aspect in which the display device is used.

5. The display method according to claim 3, wherein the display device is configured to be driven by at least one of a commercial power supply and a battery, and when it is determined that the display device is driven by only the battery, the explanation screen is displayed in an aspect in which the first mode is recommended.

6. The display method according to claim 1, wherein the display device is configured to be driven by a battery, and when the display device determines that a remaining capacity of the battery is less than a first capacity, the explanation screen is displayed in an aspect in which the first mode is recommended.

7. A display device comprising a processor configured to control: displaying an explanation screen including explanation of a first mode for starting in response to a first trigger and explanation of a second mode for starting in response to a second trigger different from the first trigger; and displaying a setting screen for receiving setting of one of the first mode and the second mode after displaying the explanation screen, wherein the explanation screen includes at least one of explanation concerning power consumption of the display device in the first mode and explanation concerning power consumption of the display device in the second mode; and wherein the explanation screen includes: explanation that the first trigger is coupling between the display device and a transmission device that transmits a signal to the display device; and explanation that the second trigger is detection of the signal by the display device.

8. A non-transitory computer-readable storage medium storing an information processing program, the information processing program causing a computer to execute: causing a display device to display an explanation screen including explanation of a first mode for starting the display device in response to a first trigger and explanation of a second mode for starting the display device in response to a second trigger different from the first trigger; and causing the display device to display a setting screen for receiving setting of one of the first mode and the second mode after displaying the explanation screen, wherein the explanation screen includes at least one of explanation concerning power consumption of the display device in the first mode and explanation concerning power consumption of the display device in the second mode; and wherein the explanation screen includes: explanation that the first trigger is coupling between the display device and a transmission device that transmits a signal to the display device; and explanation that the second trigger is detection of the signal by the display device.

* * * * *